Patented Mar. 25, 1930

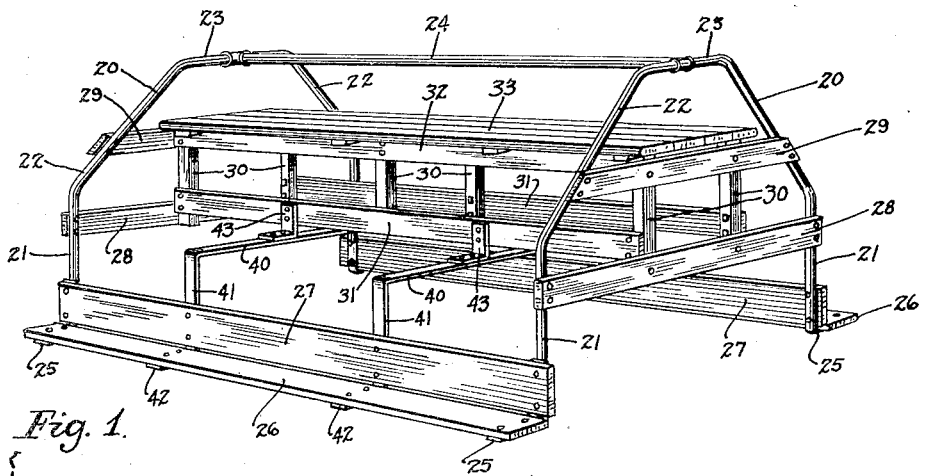
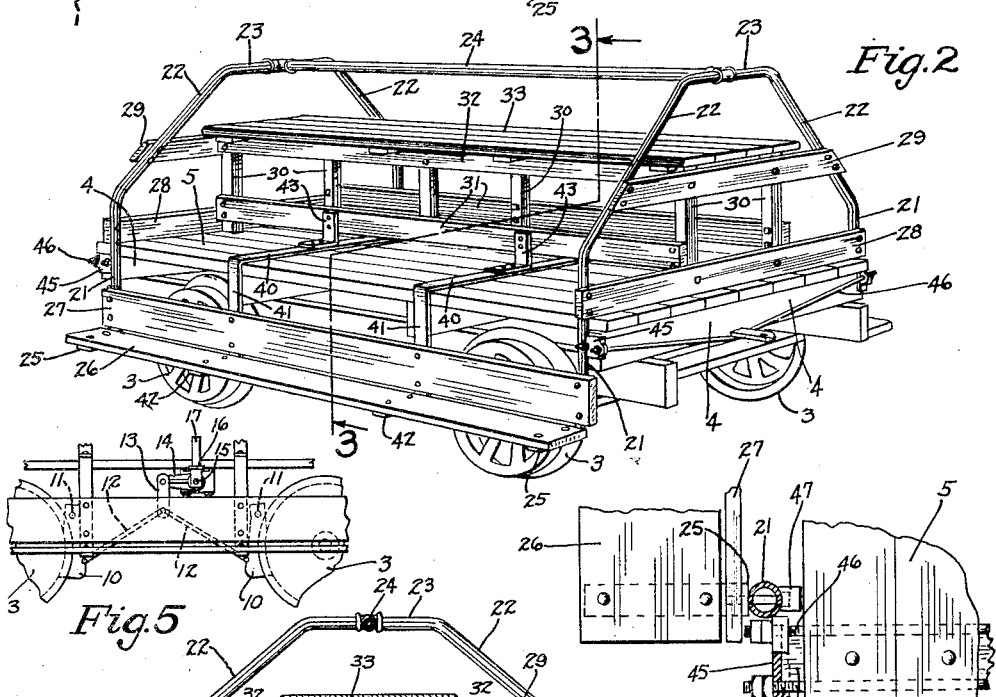
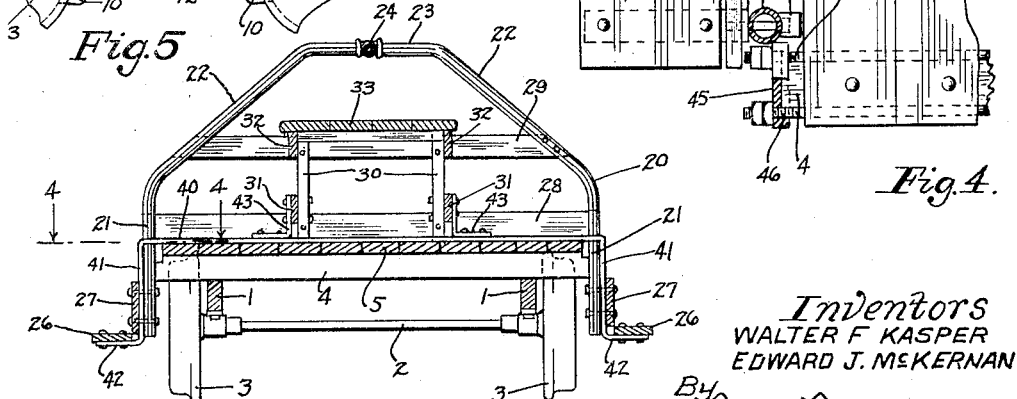

1,751,924

UNITED STATES PATENT OFFICE

WALTER F. KASPER, OF FAIRMONT, MINNESOTA, AND EDWARD J. McKERNAN, OF TOPEKA, KANSAS, ASSIGNORS TO FAIRMONT RAILWAY MOTORS, INC., OF FAIRMONT, MINNESOTA, A CORPORATION OF MINNESOTA

SET-OFF VEHICLE TOP

Application filed May 29, 1929. Serial No. 367,002.

This invention relates to improvements in trailer attachments, such as are used in railway track work to carry workmen and tools to the desired location. The device herein is known as a "set off" trailer top and is adapted to be detachably secured to any trailer, or equivalent device, in a very simple manner.

Objects of the invention are: to provide a unit of the nature mentioned adapted for attachment to a wheeled vehicle, and including parts arranged to provide a seat above the level of the vehicle floor of dimensions to expose sufficient floor space to provide floor seating capacity laterally of the seat, in some instances on both sides, and thus provide for the comfort of the passengers as well as increase the carrying capacity of the car; to provide such a seat and to provide a storage space therebeneath in which tools can be carried; to provide means for preventing accidental displacement of the tools carried under the seat and to permit ready access thereto; to provide a skeleton frame structure for the above purposes; to extend certain of the parts which compose the unit laterally of the vehicle to provide a wheel guard disposed to serve as a step, and as a foot rest for those seated upon the floor; to have portions of the guard-forming structure cooperative with portions of the car to prevent lateral and longitudinal motions of the unit with reference to the car; to have parts of the unit arranged to provide hand rails, one adjacent each end and adapted to lie transversely of the vehicle when the device is attached, and one arranged substantially centrally and longitudinally of the vehicle above the seat, dividing the seat so that those seated at opposite sides of the rail are provided with a hand hold or arm rest; and generally to provide a cheap, simple construction for each and all of the purposes above mentioned. Another feature is that the unit can be simply lifted off. No fastening devices in the usual sense of the word are used. To apply, the device is simply brought over the car and then lowered to engage the car substantially in the same manner that a lid or cover is placed over a box.

Features of the invention include all the details of construction, as well as the arrangement of the brake operating mechanism, permitting it to be in accessible and operative position when the trailer top is operatively disposed upon the car.

Objects, advantages and features of the invention will appear from the description of the drawings, forming a part of this application, and in said drawings Figure 1 is a perspective view of the unit detached;

Figure 2 is a perspective view applied to a wheeled vehicle of the trailer type;

Figure 3 is a transverse section substantially on line 3—3 of Figure 2;

Figure 4 is a plan section at one corner of the device showing a portion of the guard and step-forming elements cooperating to prevent longitudinal and transverse movements of the unit; and Figure 5 is a fragmentary side view illustrating the arrangement of the brake shoes, and brake shoe operating mechanism, in relation to the vehicle and set-off top or unit.

The push car or trailer is provided with sills 1, axle 2 and wheels 3. On top of the sills 1 are placed cross bars 4 and on these cross sills is arranged the floor 5.

A suitable brake mechanism is provided including the shoes 10 pivoted as at 11, and connected by links 12, with link 13 in turn connected to arm 14, carried by a rotatively mounted cross shaft 15. The end of the shaft is provided with a socket 16 in which the handle 17 is removably received. The socket is arranged so that the device, forming the principal part of this invention, can be placed upon the car without interference by the socket, and so that after such placement the handle can be operatively engaged with the socket in such relation to the car and trailer unit as will make it accessible to and capable of operation by those who are seated or standing upon the set-off top, or unit. This is a feature of the invention, and includes details of the parts and arrangement thereof.

Although not illustrated in the drawing, it is to be understood that the brake shoes and operating mechanism are duplicated on the opposite side of the car, and that the shaft extends crosswise of the machine and operates brake shoes constructionally and operably identical with the ones shown. However, it is only necessary to provide an operating handle socket at one side of the car, and to arrange the parts of the trailer deck, so that the socket does not interfere with the attachment of the unit; and so that it is disposed to receive the handle, and so that after the handle is engaged in the socket, the braking operation is not interfered with by any part of the deck or trailer top. To simplify the illustration, the braking mechanism has only been shown in Figure 5.

The general construction of the set-off top is best shown in Figure 1 while its operative relation with the trailer is best shown in Figure 3. The device includes two terminal arch members 20 also forming transversely arranged hand rails. Each arch member includes vertical portions 21, acting as stops cooperative with the trailer to prevent lateral and longitudinal motions of the unit. Upwardly, inwardly slanting portions 22 are also provided, as well as a horizontal top portion 23. The horizontal top portions are connected by a hand rail and brace rod 24, which acts also to divide a seat, later to be described, into opposite halves, and to provide an arm rest. Each element 21 is provided with an out-turned foot 25, and secured to these out-turned horizontal portions is a step and foot board 26, which also acts to brace the lower portions of the arch frames. In this case the foot elements 25 have the form of strap-iron brackets bolted to the portions 21 of the arch frames. Adjacent the board 26 is arranged a guard board 27, which, when the device is applied to the car, lies in a position to prevent accidental contact of the body or clothing of passengers with the wheels, see Figure 3. The guard is secured by bolts, which also secure foot pieces 25.

Arranged horizontally of each arch are cross pieces respectively designated 28—29, and to these cross pieces at the inner side are suitably secured uprights 30, in pairs. Connecting these uprights at top and bottom are longitudinally extending elements 31—32, these elements being arranged in pairs at opposite sides as shown. The ensemble of elements just described forms a kind of skeleton structure, which defines a tool space, (when the device is attached to the car) and also provides frame work for a seat or arm rest, the seat or arm rest proper being indicated at 33. The elements 28 and 31 act as tool guards, and when the device is attached the elements 28 engage the top surface of the floor of the vehicle. The elements 31 may also engage the floor but in this instance are shown slightly spaced above it. Cross brace members 40 having down-turned portions 41 and outwardly turned foot portions 42 are attached by means of suitable brackets 43 to the elements 31. The element 40 also engages flatly against the top surface of the floor when the device is attached. The fastening devices for the brackets 43, pass through elements 31 and additional uprights 30, see Figure 3.

A feature of the invention includes the provision of the seat arranged above the level of the vehicle floor of dimensions to expose sufficient floor surface to provide a seating space laterally (in this case on both sides) of the seat. Where the floor is utilized as a seat instead of the seat proper, the seat may form an arm rest, and either elements 31 or 32 may serve as hand rails, or grips.

When the floor of the car is utilized as a seat, the element 26 serves as a foot rest, and the element 27 as a guard. The area of that exposed portion of the floor which serves as a seat is sufficient to provide foot room for those seated on the element 31, when other persons are seated on the floor.

Referring to Figure 4, it will be noted that truss rod plates 45 cap lateral extensions of the end cross bars 4 or sills. Truss rods 46 connect these cap plates. As is shown in this figure, these cap plates cooperate with the extensions 21 to prevent movement of the unit longitudinally of the car. The element 21 also cooperates with the side of the car to prevent lateral movement of the unit. In this instance, a spacer block 47 has been shown interposed between the element 21 and the side of the car. It will be understood, however, that the element 21 may engage directly with the side of the car. Such degree of lateral movement of course must be prevented so that the guard 27 will not come in contact with the wheels. Of course other means could be used as stops, but inasmuch as the plates 45 are part of the regular equipment of the vehicle, they are conveniently utilized for the purpose set forth.

As before stated, the unit can be applied and removed substantially in the same manner that a lid or cover is placed over or removed from a box.

We claim as our invention:

1. A unit adapted for attachment to a wheeled vehicle including parts arranged to provide a seat above the level of the vehicle floor, of dimensions to expose sufficient floor surface to provide seating space laterally of the seat.

2. A unit adapted for attachment to a wheeled vehicle including parts arranged to provide a seat above the level of the vehicle floor, of dimensions to expose sufficient floor surface to provide seating space laterally of the seat, and including elements arranged to prevent accidental loss of articles placed beneath the seat.

3. A unit adapted for attachment to a wheeled vehicle including parts arranged to provide hand rails, and to provide a seat above the level of the vehicle floor, with one of the hand rails extending longitudinally of the vehicle and seat above the level of the seat, said seat being of dimensions to expose sufficient floor surface to provide seating space laterally of the seat.

4. A unit adapted for attachment to a wheeled vehicle including parts arranged to provide a seat above the level of the vehicle floor and a hand rail extending longitudinally of the vehicle and seat above the level of the seat, certain of the parts being extended laterally of the vehicle to provide a wheel guard disposed to serve as a step.

5. A unit adapted for attachment to a wheeled vehicle, including parts arranged to provide a seat above the level of the vehicle, said seat being of dimensions to expose sufficient vehicle floor surface to provide seating space laterally of the seat, certain of the parts being extended laterally of the vehicle to provide a wheel guard disposed to serve as a step, and also to act as a foot rest.

6. A unit for the purpose described including parts arranged to provide hand rails, and to provide a seat above the level of the car of dimensions to expose sufficient car floor surface to provide seating space laterally of the seat, and including elements arranged to prevent accidental loss of articles placed beneath the seat, certain of the parts being extended laterally of the car to provide a wheel guard disposed to serve as a step, and also as a foot rest for those seated on the car floor.

7. A unit for the purpose described including parts arranged to provide hand rails, and to provide a seat above the level of the car of dimensions to expose sufficient car floor surface to provide seating space laterally of the seat, and including elements arranged to prevent accidental loss of articles placed beneath the seat, certain of the parts being arranged to extend laterally of the car to provide a wheel guard and disposed to serve as a step, and also as a foot rest for those seated on the car floor, certain of the parts being arranged and being cooperative with the car to substantially prevent horizontal motions of said unit.

8. A unit for attachment to a wheeled vehicle, including parts arranged to provide hand rails one adjacent each end and transversely of the vehicle, and one substantially centrally and longitudinally of the vehicle when the device is attached, and to provide a seat spaced below the centrally arranged hand rail and above the level of the vehicle floor, and of dimensions to expose sufficient vehicle floor surface to provide seating space laterally of the seat.

9. A unit for attachment to a car, including parts arranged to provide hand rails one adjacent each end and transversely of the car, and one substantially centrally and longitudinally of the car when the device is attached, and to provide a seat spaced below the centrally arranged hand rail and above the level of the car, and of dimensions to expose sufficient car floor surface to provide seating space laterally of the seat, certain of the parts being arranged to extend laterally of the car to provide a wheel guard, disposed to serve as a step, and also as a foot rest for those seated on the car floor.

10. A unit for attachment to a wheeled vehicle including parts arranged to provide hand rails one adjacent each end and transversely of the car, and one substantially centrally and longitudinally of the car when the device is attached, and to provide a seat spaced below the centrally arranged hand rail and above the level of the car, and of dimensions to expose sufficient car floor surface to provide seating space laterally of the seat, and including elements arranged at the sides and ends of the seat to prevent accidental loss of articles placed beneath the seat, certain of the parts being arranged to extend laterally of the car to provide a wheel guard, disposed to serve as a step, and also as a foot rest for those seated on the car floor.

11. A unit for attachment to a wheeled vehicle, including parts arranged to provide a seat above the floor level of the vehicle, said seat being of dimensions to expose sufficient floor surface to provide seating space laterally of the seat, certain of the parts being extended laterally of the car to provide a wheel guard disposed to serve as a step, and also to act as a foot rest for those seated upon the floor, and having portions cooperating with the car to prevent lateral and longitudinal motions of the unit with reference to the car.

In witness whereof, I have hereunto set my hand this 30th day of April, 1929.

WALTER F. KASPER.

In witness whereof, I have hereunto set my hand this 23d day of April, 1929.

EDWARD J. McKERNAN.